United States Patent
Shi et al.

(10) Patent No.: US 12,418,452 B2
(45) Date of Patent: Sep. 16, 2025

(54) METHOD AND APPARATUS FOR PROCESSING SERVICE ALARM BASED ON CDN, DEVICE, AND MEDIUM

(71) Applicant: Beijing Volcano Engine Technology Co., Ltd., Beijing (CN)

(72) Inventors: Chunman Shi, Beijing (CN); Jian Wang, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/948,109

(22) Filed: Nov. 14, 2024

(65) Prior Publication Data
US 2025/0158872 A1    May 15, 2025

(30) Foreign Application Priority Data
Nov. 14, 2023   (CN) .......................... 202311511663.5

(51) Int. Cl.
H04L 41/0604    (2022.01)
H04L 41/0631    (2022.01)

(52) U.S. Cl.
CPC ...... *H04L 41/0613* (2013.01); *H04L 41/0631* (2013.01)

(58) Field of Classification Search
None
See application file for complete search history.

(56) References Cited

U.S. PATENT DOCUMENTS

| | | |
|---|---|---|
| 11,044,533 B1 | 6/2021 | Li et al. |
| 11,336,506 B1 | 5/2022 | Li et al. |
| 2002/0078233 A1 | 6/2002 | Biliris et al. |
| 2015/0220377 A1 | 8/2015 | Reese et al. |
| 2022/0094606 A1 | 3/2022 | Casey et al. |
| 2022/0255789 A1* | 8/2022 | Wang ...................... H04L 67/55 |

(Continued)

FOREIGN PATENT DOCUMENTS

| | | |
|---|---|---|
| CN | 105656699 A | 6/2016 |
| CN | 105656699 B | 12/2018 |

(Continued)

OTHER PUBLICATIONS

Office Action for Chinese Patent Application No. 202311511663.5, mailed on Dec. 20, 2023, 11 pages.

(Continued)

*Primary Examiner* — Joshua Joo
(74) *Attorney, Agent, or Firm* — Astute IP Law Group (57) ABSTRACT

The present disclosure provides a method and apparatus for processing a service alarm based on a CDN, a device, and a medium. The method includes obtaining detection data and cause analysis data corresponding to a target domain name. The method further includes determining whether to perform a service alarm corresponding to the target domain name by using the detection data. The method further includes in response to determining to perform the service alarm corresponding to the target domain name, determining a cause of the service alarm by using the cause analysis data. The method further includes obtaining a sending policy corresponding to the cause of the service alarm, and sending the cause of the service alarm according to the sending policy.

17 Claims, 4 Drawing Sheets

(56) References Cited

U.S. PATENT DOCUMENTS

| | | | |
|---|---|---|---|
| 2023/0032874 A1* | 2/2023 | Waghorn | G06F 21/552 |
| 2023/0128202 A1* | 4/2023 | Minda | G06F 11/302 |
| | | | 709/217 |
| 2023/0171269 A1* | 6/2023 | Rajasekharan | H04L 63/1416 |
| | | | 726/23 |
| 2024/0236117 A1* | 7/2024 | McGrew | H04L 63/1441 |
| 2025/0014043 A1* | 1/2025 | Kramme | G06Q 20/24 |

FOREIGN PATENT DOCUMENTS

| | | |
|---|---|---|
| CN | 111294412 A | 6/2020 |
| CN | 112312209 A | 2/2021 |
| CN | 107995046 B | 8/2021 |
| CN | 114327964 A | 4/2022 |
| CN | 114363151 A | 4/2022 |
| CN | 115333917 A | 11/2022 |
| CN | 115941432 A | 4/2023 |
| CN | 116248473 A | 6/2023 |
| CN | 117255005 A | 12/2023 |

OTHER PUBLICATIONS

International Search Report and Written Opinion for International Application No. PCT/CN2024/129749, mailed on Feb. 13, 2025, 16 pages.
Extended European Search Report for European Patent Application No. 24212809.8, mailed on Mar. 17, 2025, 11 pages.

* cited by examiner

METHOD AND APPARATUS FOR PROCESSING SERVICE ALARM BASED ON CDN, DEVICE, AND MEDIUM

CROSS-REFERENCE TO RELATED APPLICATION(S)

This application claims priority to Chinese Application No. 202311511663.5 filed on Nov. 14, 2023, the disclosure of which is incorporated herein by reference in its entity.

FIELD

The present disclosure relates to the field of network communications, and in particular, to a method and apparatus for processing a service alarm based on a CDN, a device, and a medium.

BACKGROUND

Service detection is an important part of a content delivery network (CDN) service. Currently, after a CDN service alarm is triggered, an operation and maintenance person can immediately intervene to process a problem and stop losses in a timely manner to ensure the stability of a customer service. Therefore, whether the operation and maintenance person can intervene to process the problem immediately after the alarm is triggered is crucial. With the gradual increase in CDN services, the number of alarms has exploded, and there are many causes of the alarms, among which alarms triggered by a source station problem and a normal behavior account for a relatively high proportion. The operation and maintenance person only needs to focus on CDN problems.

An existing solution is mainly to set an automatic processing script for automatic alarm processing. However, there are many causes of the alarms, and the automatic processing script can only process very simple functions and often makes errors. Eventually, manual intervention is still required. In addition, in the face of a large amount of alarms, a real alarm cause cannot be distinguished.

SUMMARY

In view of the above, embodiments of the present disclosure provide a method and apparatus for processing a service alarm based on a CDN, an electronic device, and a storage medium, to solve the problem that a real alarm cause cannot be distinguished in the face of a large amount of alarms.

In a first aspect, an embodiment of the present disclosure provides a method for processing a service alarm based on a CDN. The method includes: obtaining detection data and cause analysis data corresponding to a target domain name, wherein the detection data is obtained based on detecting an access behavior of a client corresponding to a CDN node to the target domain name, and the cause analysis data is obtained based on the access behavior and node performance data of the CDN node; determining, by using the detection data, whether to perform a service alarm corresponding to the target domain name; in response to determining to perform the service alarm corresponding to the target domain name, determining a cause of the service alarm by using the cause analysis data; and obtaining a sending policy corresponding to the cause of the service alarm, and sending the cause of the service alarm according to the sending policy.

In a second aspect, an embodiment of the present disclosure provides an apparatus for processing a service alarm based on a CDN. The apparatus includes: an obtaining module configured to obtain detection data and cause analysis data corresponding to a target domain name, wherein the detection data is obtained based on detecting an access behavior of a client corresponding to a CDN node to the target domain name, and the cause analysis data is obtained based on the access behavior and node performance data of the CDN node; a determining module configured to determine, by using the detection data, whether to perform a service alarm corresponding to the target domain name; an analysis module configured to, in response to determining to perform the service alarm corresponding to the target domain name, determine a cause of the service alarm by using the cause analysis data; and a sending module configured to obtain a target recipient device corresponding to the cause of the service alarm, and send the cause of the service alarm to the target recipient device.

In a third aspect, an embodiment of the present disclosure provides a computer device, including: a memory and a processor, wherein the memory and the processor are communicatively connected to each other, the memory is stored with computer instructions, and the processor is configured to execute the computer instructions to perform the method according to the first aspect or any one of the corresponding implementations of the first aspect.

In a fourth aspect, an embodiment of the present disclosure provides a computer-readable storage medium, wherein the computer-readable storage medium is stored with computer instructions, and the computer instructions are configured to cause a computer to perform the method according to the first aspect or any one of the corresponding implementations of the first aspect.

BRIEF DESCRIPTION OF THE DRAWINGS

In order to more clearly describe the specific implementations of the present disclosure or the technical solutions in the prior art, the accompanying drawings for describing the specific implementations or the prior art will be briefly described below. Apparently, the accompanying drawings in the following description show some implementations of the present disclosure, and a person of ordinary skill in the art may still derive other drawings from these accompanying drawings without creative efforts.

DETAILED DESCRIPTION OF EMBODIMENTS

In order to make the objectives, technical solutions, and advantages of the embodiments of the present disclosure clearer, the technical solutions in the embodiments of the present disclosure will be described clearly and completely below with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts fall within the protection scope of the present disclosure.

According to an embodiment of the present disclosure, a method and apparatus for processing a service alarm based on a CDN, an electronic device, and a storage medium are provided. It should be noted that the steps shown in the flowcharts of the accompanying drawings may be performed in a computer system such as a set of computer-executable instructions, and although a logical order is shown in the flowcharts, in some cases, the steps shown or described may be performed in a sequence different from that herein.

Figure 1:
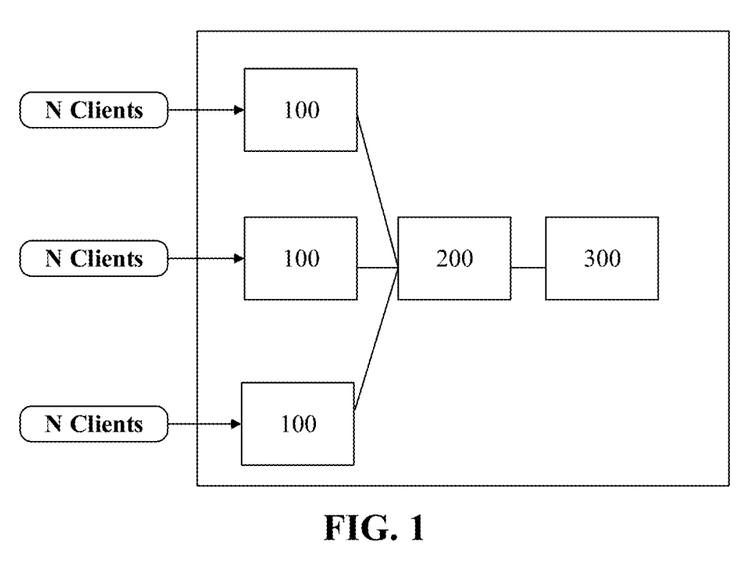
FIG. 1 is a schematic diagram of a system for processing a service alarm based on a CDN according to some embodiments of the present disclosure.

FIG. 1 is a schematic diagram of a system for processing a service alarm based on a CDN according to an embodiment of the present disclosure. As shown in FIG. 1, the system includes: a big data platform and a plurality of CDN nodes. A CDN node may be understood as a CDN server, an alarm processing terminal, the big data platform is connected to the plurality of CDN nodes, and the big data platform is connected to the alarm processing terminal. The big data platform is a comprehensive software and hardware infrastructure for managing, processing, and analyzing large-scale datasets, and may be understood as a system composed of a plurality of components and services.

A CDN node 100 is configured to detect an access of a client to a domain name, and record an access log of the domain name. The CDN node sends the access log and node performance data of the CDN node to the big data platform at a preset time. The access log mainly includes a time, a domain name, a status code, a client IP, an abnormal status code, a source of the abnormal status code, and the like. The node performance data mainly includes a load, a retransmission rate, a memory, a packet loss rate of the CDN node, and the like. In addition, the source of the abnormal status code may be recorded by a cache service component in the CDN node. The cache service component may be used as a client which may make a request to a source station. When the source station directly returns an abnormal status code (4XX or 5XX), the source of the abnormal status code is recorded. When the source station is abnormal and cannot be accessed, the cache service component records an abnormal cause, such as TCP link failure or HTTP no response.

The big data platform 200 is configured to receive access logs and node performance data sent by the respective CDN nodes, aggregate and clean the access logs and the node performance data to obtain detection data and cause analysis data corresponding to a client accessing each domain name. Specifically, the big data platform cleans the access logs to obtain detection data, and the detection data includes: a time, a domain name, a status code, a bandwidth, and the like. The cause analysis data includes: a domain name, a UA/referer/client IP distribution, a source of an abnormal status code, a CPU load of a CDN node, a memory utilization, a disk IO, and the like.

Specifically, first, access logs and node performance data are collected from each CDN node and sent to the big data platform. On the big data platform, appropriate tools (such as Flume or Kafka) are used to aggregate these data to ensure the integrity and consistency of the data.

Second, the aggregated access log data is cleaned, which mainly includes the following steps.

Each field in the access log is parsed, such as a time, a domain name, a status code, a bandwidth, and the like. Invalid data, such as an abnormal status code or an invalid domain name, is filtered out based on a predefined rule or pattern. The parsed data is standardized to conform to a unified data format and structure. For example, a time field is converted into a unified time format, and a status code is converted into a standard status code. Abnormal detection is performed on the data to identify data points that may have problems. For example, a data point with an abnormally high or low access frequency is detected.

The node performance data is cleaned, i.e., the aggregated node performance data is cleaned, which mainly includes the following steps. Each field in the node performance data is parsed, such as a CPU load, a memory usage, a disk IO, and the like. Invalid data, such as an abnormal node state or an invalid performance indicator, is filtered out based on a predefined rule or pattern. The parsed data is standardized to conform to a unified data format and structure. For example, a node state is converted into a standard state description, and a performance indicator is converted into a standard indicator name. Abnormal detection is performed on the data to identify data that may have problems. For example, data with an abnormally high CPU load or an abnormally low memory usage is detected.

Finally, the detection data is obtained based on the cleaned access logs, and the cause analysis data is obtained based on the cleaned access logs and the node performance data.

An alarm processing terminal 300 is configured to receive the detection data and the cause analysis data sent by the big data platform, and then determine, by using the detection data, whether to perform a service alarm corresponding to a target domain name, and in response to determining to perform the service alarm corresponding to the target domain name, determine a cause of the service alarm by using the cause analysis data. Finally, a sending policy corresponding to the cause of the service alarm is obtained, and the cause of the service alarm is sent according to the sending policy.

In the embodiments of the present disclosure, the access behavior of the client to the target domain name is detected to obtain corresponding detection data, and the detection data is used to determine whether to perform the service alarm for the target domain name. In response to performing the service alarm, problem location and analysis are directly performed by using the cause analysis data to determine the cause of the service alarm. Even in the face of a large number of service alarms, a real alarm cause can also be determined and sent to a recipient device in time, so as to assist the operation and maintenance personnel to quickly respond to and process an abnormal access, improving the processing rate of the service alarm. At the same time, the stability and accuracy of the system are improved.

Figure 2:
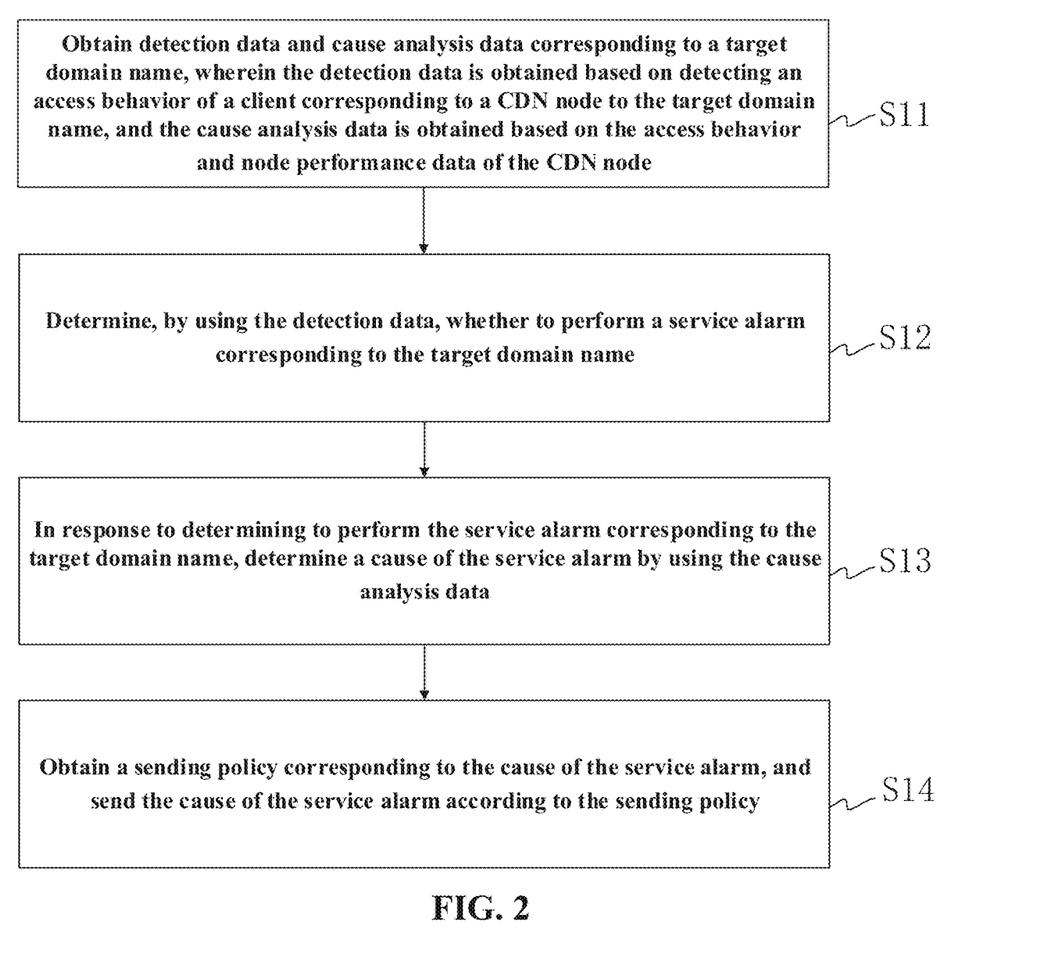
FIG. 2 is a schematic flowchart of a method for processing a service alarm based on a CDN according to some embodiments of the present disclosure.

An embodiment of the present disclosure provides a method for processing a service alarm based on a CDN. FIG. 2 is a flowchart of a method for processing a service alarm based on a CDN according to an embodiment of the present disclosure. As shown in FIG. 2, the process includes the following steps.

At step S11, detection data and cause analysis data corresponding to a target domain name are obtained. The detection data is obtained based on detecting an access behavior of a client corresponding to a CDN node to the target domain name, and the cause analysis data is obtained based on the access behavior and node performance data of the CDN node.

The method provided in the embodiment of the present disclosure is applied to an alarm processing terminal. The alarm processing terminal receives the detection data and the cause analysis data corresponding to each CDN node that are sent by a big data platform. The detection data is obtained based on an access log. The access log is obtained by detecting, by the CDN node, the access behavior of a client to a client. The detection data includes: a time, a target domain name, a status code, a bandwidth, a network delay, and the like. The cause analysis data is obtained based on the access log and the node performance data of the CDN node. The cause analysis data includes: the target domain name, a UA/referer/client IP distribution, a source of an abnormal status code, a CPU load of a CDN node, a memory, a disk IO, and the like.

At step S12, whether to perform a service alarm corresponding to the target domain name is determined by using the detection data.

In some optional implementations, determining, by using the detection data, whether to perform the service alarm corresponding to the target domain name includes the following steps A1 to A4.

At step A1, a domain name blocking list is queried.

In some optional implementations, in a process of determining, by using the detection data, whether to perform the service alarm corresponding to the target domain name, the alarm processing terminal first queries a pre-configured domain name blocking list, and the domain name blocking list includes a plurality of domain names for which it is not required to perform alarm determination. Specifically, when some domain names frequently generate invalid service alarms with a high frequency, in order to reduce interference of invalid alarms, the embodiment of the present disclosure configures the domain name blocking list, and by configuring the domain name blocking list, the domain names that frequently generate the invalid service alarms with the high frequency can be blocked. A blocked domain name will not be performed a subsequent service alarm determination process.

At step A2, in response to the target domain name being not included in the domain name blocking list, access behavior data corresponding to each preset indicator is extracted from the detection data.

In some optional implementations, in response to the target domain name being not included in or not existed in the domain name blocking list, the alarm processing terminal may extract, from the detection data, access behavior data corresponding to each preset indicator. The preset indicator may be a bandwidth, a network delay, a status code, and the like. The access behavior data corresponding to the bandwidth is a bandwidth utilization, a bandwidth traffic, a bandwidth error rate, and the like. The access behavior data corresponding to the network delay is a network delay level, a delay time, and the like. The access behavior data corresponding to the status code is a key code segment of the status code.

At step A3, an alarm detection policy corresponding to the target domain name is obtained. The alarm detection policy includes an alarm condition corresponding to each preset indicator.

In some optional implementations, each domain name corresponds to a different alarm detection policy, and the alarm detection policy corresponding to the domain name may be configured based on a service type corresponding to the domain name. For example, for each service type, an indicator that needs to be detected is determined, and different indicators such as a bandwidth, a network delay, and a status code may be selected according to characteristics and requirements of the service type. The alarm detection policy includes an alarm condition corresponding to each preset indicator.

For example, taking the bandwidth as an example, the alarm condition corresponding to the bandwidth includes: triggering an alarm when a bandwidth utilization reaches or exceeds a preset utilization threshold. For example, it may be set that an alarm is triggered when the bandwidth utilization exceeds 80%. An alarm may be triggered when a bandwidth traffic reaches or exceeds a preset threshold. For example, it may be set that an alarm is triggered when the bandwidth traffic exceeds 1 GB/s. An alarm may be triggered when a bandwidth error rate reaches or exceeds a preset threshold. For example, it may be set that an alarm is triggered when the bandwidth error rate exceeds 0.5%.

At step A4, the access behavior data corresponding to the preset indicator is matched with the alarm condition, to determine whether to perform the service alarm corresponding to the target domain name.

In some optional implementations, matching the access behavior data corresponding to the preset indicator with the alarm condition, to determine whether to perform the service alarm corresponding to the target domain name includes: in response to the access behavior data corresponding to the preset indicator hitting the alarm condition, determining to perform the service alarm corresponding to the target domain name; or in response to the access behavior data corresponding to the preset indicator not hitting the alarm condition, determining not to perform the service alarm corresponding to the target domain name.

For example, taking the bandwidth as an example, in response to the bandwidth utilization exceeding the utilization threshold of 80%, it is determined that the alarm condition is hit, and the service alarm is to be performed. In response to the bandwidth traffic exceeding the traffic threshold of 1 GB/s, it is determined that the alarm condition is hit, and the service alarm is to be performed. In response to the bandwidth error rate exceeding the bandwidth error rate threshold of 0.5%, it is determined that the alarm condition is hit, and the service alarm is to be performed.

At step S13, in response to determining to perform the service alarm corresponding to the target domain name, a cause of the service alarm is determined by using the cause analysis data.

In some optional implementations, in response to determining to perform the service alarm corresponding to the target domain name, it is determined whether the target domain name is configured with a corresponding alarm diagnosis mechanism. In response to the domain name being configured with the alarm diagnosis mechanism, the alarm diagnosis mechanism is triggered to take effect. In response to the target domain name being not configured with the corresponding alarm diagnosis mechanism, a default alarm policy is obtained, and alarm information is sent to a processing terminal configured in the default alarm policy. The alarm information may be understood as alarm prompt information.

For example, a domain name www.example.com corresponds to a target service, and there are a plurality of subdomain names under the domain name, for example: video.example.com and music.example.com. Video.example.com corresponds to a video service under the target service. Music.example.com corresponds to a music service under the target service.

Video.example.com is configured with an alarm diagnosis mechanism, and music.example.com is not configured with an alarm diagnosis mechanism. When processing a service alarm of a domain name, the alarm processing terminal diagnoses, in response to the domain name being configured with the alarm diagnosis mechanism, the service alarm by using the cause analysis data to determine a cause of the service alarm. In response to domain name being not configured with the alarm diagnosis mechanism, an alarm is directly performed according to a default alarm policy.

In some optional implementations, determining the cause of the service alarm by using the cause analysis data includes the following steps B1 to B6.

At step B1, an indicator change corresponding to the preset indicator is extracted from the cause analysis data.

In some optional implementations, the indicator change corresponding to the preset indicator may be a sudden drop in a bandwidth, a sudden increase in a bandwidth, a sudden increase in a status code, a sudden drop in a status code, and the like.

At step B2, an alarm analysis policy corresponding to the target domain name is obtained. The alarm analysis policy includes a plurality of alarm types and a plurality of determination conditions associated with the alarm types, and each preset indicator corresponds to at least one determination condition.

In some optional implementations, each target domain name corresponds to an alarm analysis policy, and the alarm analysis policy includes a plurality of alarm types and a determination condition associated with each alarm type. The alarm types include: a normal alarm type, a CDN type, and a source station type.

Specifically, the determination condition corresponding to the normal alarm type is as follows.

① Bandwidth change: a sudden drop in a bandwidth, a sudden drop in a number of requests, no sudden increase in a 4XX or 5XX status code, and a normal external probing request result.

② 4XX status code change: a sudden increase in a status code, a source of the status code being a source station or a CDN authentication logic being triggered, and a client IP, a UA, or a referer being concentrated.

The determination condition corresponding to the CDN type is as follows.

① Bandwidth change: any one of the following two conditions is satisfied:
1. a sudden drop in a bandwidth, a normal number of requests, a sudden increase in an abnormal status code such as 4XX or 5XX, and a source of the abnormal status code being not an source station; and
2. a sudden drop in a bandwidth, a sudden drop in a number of requests, and an external detection failure, wherein the external detection failure may be understood as that: when a client requests to access, the access fails.

② 5XX status code change: a sudden increase in an abnormal status code, a source being not a source station, a CDN logic being not triggered, or a machine performance indicator being overloaded or a node packet being lost.

③ 4XX status code change: a sudden increase in an abnormal status code, a source being not a source station, a CDN logic being not triggered, and a user indicator such as a client IP, a referer, or a UA being not concentrated.

The determination condition corresponding to the source station type is as follows.

① Bandwidth change: a sudden drop in a bandwidth, a normal number of requests, a sudden increase in an abnormal status code, and a source of the abnormal status code is a source station.

② 4XX status code change: a sudden increase in a status code, and the status code being an abnormal status code, and a source of the abnormal status code being a source station.

③ 5XX status code change: a sudden increase in an abnormal status code, and a source of the abnormal status code being a source station.

At step B3, the indicator change corresponding to the preset indicator is matched with a corresponding determination condition.

In some optional implementations, the indicator change corresponding to each preset indicator in the current cause analysis data is respectively matched with the determination condition corresponding to each alarm type, to determine a hit determination condition of the indicator change.

At step B4: in response to the indicator change corresponding to the preset indicator hitting the corresponding determination condition, the hit determination condition is determined as a target determination condition.

In some optional implementations, in response to the indicator change corresponding to the preset indicator hitting the corresponding determination condition, the hit determination condition is marked as the target determination condition. Since determination conditions corresponding to different alarm types are the same, for example, a bandwidth change corresponding to the CDN type and the source station type is a sudden drop in a bandwidth, by marking the hit determination condition of the indicator change, it is convenient to determine a final alarm type subsequently.

At step B5, a target alarm type corresponding to the target determination condition is obtained, from the alarm analysis policy, and an abnormal problem that causes the target alarm type is obtained.

In some optional implementations, a target determination condition corresponding to each preset indicator is obtained, and then an alarm type corresponding to the target determination conditions in common is determined as the target alarm type. At the same time, the abnormal problem corresponding to the target alarm type is obtained. For example, when the target alarm type is the CDN type, the corresponding abnormal problem includes: a TOP3 abnormal IP address, an abnormal uniform resource locator (URL), and an abnormal cause (for example, a node packet loss, a CPU load overload, etc.).

At step B6, the cause of the service alarm is generated based on the target alarm type and the abnormal problem.

In the method provided in the embodiments of the present disclosure, by setting the corresponding determination condition based on the preset indicator in the alarm analysis policy, the alarm analysis policy can be flexibly configured and adjusted according to specific service requirements to adapt to different service scenarios. Secondly, by matching the change of the preset indicator with the determination condition, the target determination condition can be determined, and the corresponding target alarm type and the abnormal problem are obtained from the alarm analysis policy, thereby generating the precise cause of the service alarm.

In some optional implementations, after obtaining, from the alarm analysis policy, the target alarm type corresponding to the target determination condition, the method further includes: detecting whether the target alarm type is a normal alarm type; in response to the target alarm type being the normal alarm type, querying a historical alarm record;

obtaining, from the historical alarm record, an alarm count of the normal alarm type corresponding to the target domain name; and in response to the alarm count being greater than or equal to a preset count, updating the target domain name to the domain name blocking list.

In the embodiments of the present disclosure, by querying the historical alarm record, the alarm count of the normal alarm type corresponding to the target domain name can be obtained, so that the alarm type can be determined more accurately. In response to the alarm count of the normal alarm type being greater than or equal to the preset count, it can be indicated that the target domain name triggers the normal alarm for a plurality of times consecutively. In order to reduce the resource of the alarm processing terminal occupied by the domain name and avoid invalid alarms, the target domain name is updated to the domain name blocking list, thereby reducing false alarms and improving the accuracy of the alarm. In addition, blocking the alarm for the domain name can also avoid interference of the alarm with a normal service.

At step S14, a sending policy corresponding to the cause of the service alarm is obtained, and the cause of the service alarm is sent according to the sending policy.

In some optional implementations, obtaining the sending policy corresponding to the cause of the service alarm, and sending the cause of the service alarm according to the sending policy include: detecting whether a target alarm type carried in the cause of the service alarm is an abnormal alarm type, wherein the abnormal alarm type includes a CDN type and a source station type; in response to the target alarm type being the abnormal alarm type, determining a target recipient device corresponding to the target alarm type based on a mapping relationship between the abnormal alarm type and a recipient device; and sending the cause of the service alarm to the target recipient device.

Figure 3:
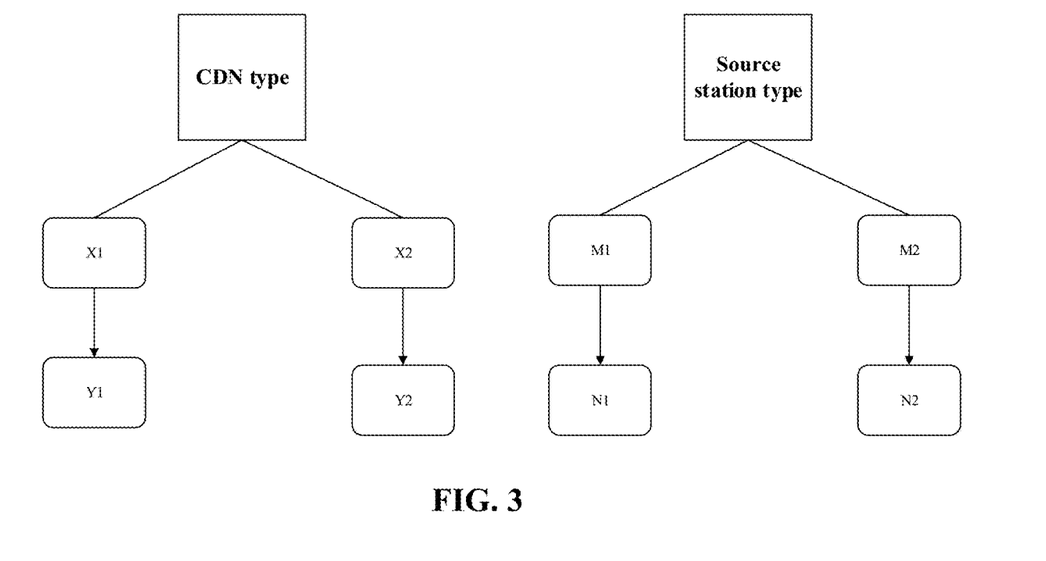
FIG. 3 is a schematic diagram of a process for sending a cause of a service alarm according to some embodiments of the present disclosure.

For example, the mapping relationship between the abnormal alarm type and the recipient device may be that: as shown in FIG. 3, the alarm type is the CDN type, the cause of the service alarm is X1, and the recipient device is Y1; the alarm type is the CDN type, the cause of the service alarm is X2, and the recipient device is Y2; the alarm type is the source station type, the cause of the service alarm is M1, and the recipient device is N1; and the alarm type is the CDN type, the cause of the service alarm is M2, and the recipient device is N2.

In the embodiments of the present disclosure, the target recipient device is automatically determined by detecting the alarm type and the mapping relationship, without manual intervention, thereby reducing manual operation time and errors. At the same time, the target recipient device is accurately determined according to the alarm type and the mapping relationship, which ensures that the alarm information can be sent to a correct device in time, thereby improving the accuracy of alarm processing. In addition, by automatically determining the target recipient device and sending the alarm, the alarm information can be quickly conveyed to a corresponding device, thereby achieving quick response and processing and improving the efficiency of troubleshooting and repair.

In the embodiments of the present disclosure, the service state is detected in real time by using the detection data, so that whether the service alarm needs to be performed can be quickly determined; and the cause of the service alarm can be accurately located by using the cause analysis data, so that a problem can be quickly located, and failure processing efficiency is improved. In the face of a large number of service alarms, areal alarm cause can be accurately identified, false alarms and failure to alarm are avoided, and the processing rate and accuracy of the service alarm are improved. In addition, the cause of the service alarm is sent according to the sending policy, which is beneficial to the stability of service operation.

In some optional implementations, the method further includes: in response to an alarm type and an alarm cause being not carried in the cause of the service alarm, obtaining a preset recipient device; and sending alarm prompt information to the preset recipient device.

In the embodiments of the present disclosure, in response to the alarm type and the alarm cause being not carried in the cause of the service alarm, it indicates that the cause analysis of the service alarm times out. In this case, an alarm prompt information is sent to the preset recipient device according to a default configuration, so as to ensure that the operation and maintenance person can quickly process the alarm.

An embodiment of the present disclosure further provides an apparatus for processing a service alarm based on a CDN. The apparatus is configured to implement the foregoing embodiments and preferred implementations, and details of which are not described again. As used below, the term "module" may be a combination of software and/or hardware that implements a predetermined function. Although the apparatus described in the following embodiments is preferably implemented in software, an implementation of hardware, or a combination of software and hardware is also possible and contemplated.

Figure 4:
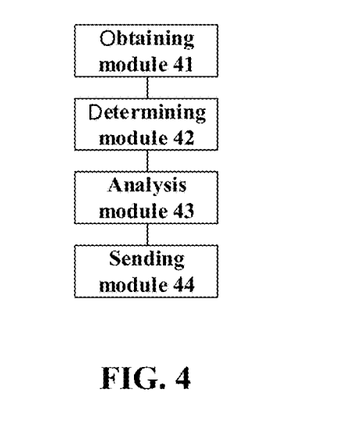
FIG. 4 is a block diagram of a structure of an apparatus for processing a service alarm based on a CDN according to an embodiment of the present disclosure.

This embodiment provides an apparatus for processing a service alarm based on a CDN. As shown in FIG. 4, the apparatus includes an obtaining module 41, a determining module 42, an analysis module 43 and a sending module 44.

The obtaining module 41 is configured to obtain detection data and cause analysis data corresponding to a target domain name, wherein the detection data is obtained based on detecting an access behavior of a client corresponding to a CDN node to the target domain name, and the cause analysis data is obtained based on the access behavior and node performance data of the CDN node.

The determining module 42 is configured to determine, by using the detection data, whether to perform a service alarm corresponding to the target domain name.

The analysis module 43 is configured to, in response to determining to perform the service alarm corresponding to the target domain name, determine a cause of the service alarm by using the cause analysis data.

The sending module 44 is configured to obtain a target recipient device corresponding to the cause of the service alarm, and send the cause of the service alarm to the target recipient device.

In some optional implementations, the determining module 42 is configured to query a domain name blocking list; in response to the target domain name being not included in the domain name blocking list, extract access behavior data corresponding to each preset indicator from the detection data; obtain an alarm detection policy corresponding to the target domain name, wherein the alarm detection policy includes an alarm condition corresponding to each preset indicator; and match the access behavior data corresponding to the preset indicator with the alarm condition, to determine whether to perform the service alarm corresponding to the target domain name.

In some optional implementations, the determining module 42 is configured to, in response to the access behavior data corresponding to the preset indicator hitting the alarm condition, determine to perform the service alarm corresponding to the target domain name; or in response to the access behavior data corresponding to the preset indicator not hitting the alarm condition, determine not to perform the service alarm corresponding to the target domain name.

In some optional implementations, the analysis module 43 is configured to extract an indicator change corresponding to the preset indicator from the cause analysis data; obtain an alarm analysis policy corresponding to the target domain name, wherein the alarm analysis policy includes a plurality of alarm types and a plurality of determination conditions associated with the alarm types, and each preset indicator corresponds to at least one determination condition; match the indicator change corresponding to the preset indicator with a corresponding determination condition; in response to the indicator change corresponding to the preset indicator hitting the corresponding determination condition, determine the hit determination condition as a target determination condition; obtain, from the alarm analysis policy, a target alarm type corresponding to the target determination condition, and obtain an abnormal problem that causes the target alarm type; and generate the cause of the service alarm based on the target alarm type and the abnormal problem.

In some optional implementations, the apparatus for processing a service alarm further includes: an updating module, configured to detect whether the target alarm type is a normal alarm type; in response to the target alarm type being the normal alarm type, query a historical alarm record; obtain, from the historical alarm record, an alarm count of the normal alarm type corresponding to the target domain name; and in response to the alarm count being greater than or equal to a preset count, update the target domain name to the domain name blocking list.

In some optional implementations, the sending module 44 is configured to detect whether a target alarm type carried in the cause of the service alarm is an abnormal alarm type, wherein the abnormal alarm type includes a CDN type and a source station type; in response to the target alarm type being the abnormal alarm type, determine a target recipient device corresponding to the target alarm type based on a mapping relationship between the abnormal alarm type and a recipient device; and send the cause of the service alarm to the target recipient device.

In some optional implementations, the apparatus further includes: a prompt module, configured to, in response to an alarm type and an alarm cause being not carried in the cause of the service alarm, obtain a preset recipient device; and send alarm prompt information to the preset recipient device.

Figure 5:
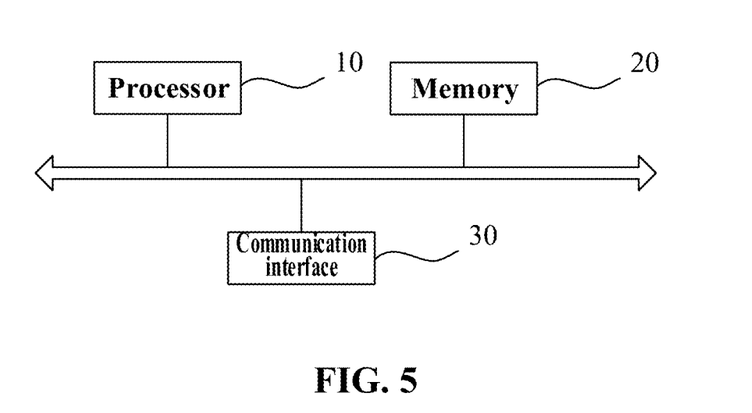
FIG. 5 is a schematic diagram of a hardware structure of a computer device according to an embodiment of the present disclosure.

Please refer to FIG. 5, which is a schematic diagram of a structure of a computer device according to an optional embodiment of the present disclosure. As shown in FIG. 5, the computer device includes: one or more processors 10, a memory 20, and an interface for connecting various components, including a high-speed interface and a low-speed interface. The various components communicate with each other using different buses and can be installed on a common main board or otherwise as required. The processor may process instructions executed in the computer device, including instructions stored in the memory or on the memory to display graphical information of a GUI on an external input/output apparatus (such as a display device coupled to the interface). In some optional implementations, if necessary, a plurality of processors and/or a plurality of buses may be used with a plurality of memories. Similarly, a plurality of computer devices may be connected, and each device provides some of necessary operations (for example, as a server array, a group of blade servers, or a multi-processor system).

The processor 10 may be a central processing unit, a network processor, or a combination thereof. The processor 10 may further include a hardware chip. The above hardware chip may be an application-specific integrated circuit, a programmable logic device, or a combination thereof. The above programmable logic device may be a complex programmable logic device, a field programmable gate array, a general array logic, or any combination thereof.

The memory 20 stores instructions executable by at least one processor 10, which are configured to cause the at least one processor 10 to perform the method shown in the above embodiment.

The memory 20 may include a program storage area and a data storage area, where the program storage area may store an operating system and an application required for at least one function; and the data storage area may store data created according to the use of a computer device for presenting a landing page of a mini program, and the like. In addition, the memory 20 may include a high-speed random access memory, and may further include a non-transitory memory, for example, at least one magnetic disk storage device, a flash memory device, or another non-transitory solid-state storage device. In some optional implementations, the memory 20 may optionally include a memory remotely arranged relative to the processor 10, and the remote memory may be connected to the computer device through a network. Examples of the above network include, but are not limited to, the Internet, an intranet, a local area network, a mobile communication network, and a combination thereof.

The memory 20 may include a volatile memory, for example, a random access memory; the memory may further include a non-volatile memory, for example, a flash memory, a hard disk, or a solid-state drive; and the memory 20 may further include a combination of the foregoing types of memories.

The computer device further includes a communication interface 30 configured for communication between the computer device and another device or communication network.

An embodiment of the present disclosure further provides a computer-readable storage medium. The method according to the embodiment of the present disclosure may be implemented in hardware or firmware, or implemented as computer code recorded in a storage medium, or implemented as original computer code stored in a remote storage medium or a non-transitory machine-readable storage medium and downloaded through a network and to be stored in a local storage medium, so that the method described herein may be performed by such software stored in a storage medium by using a general-purpose computer, a special-purpose processor, or programmable or special-purpose hardware. The storage medium may be a magnetic disk, an optical disk, a read-only memory, a random access memory, a flash memory, a hard disk, a solid-state drive, or the like. Further, the storage medium may further include a combination of the foregoing types of memories. It may be understood that a computer, a processor, a microprocessor controller, or programmable hardware includes a storage component that can store or receive software or computer code, and the software or computer code, when is accessed and executed by the computer, the processor, or the hardware, implements the method shown in the above embodiment.

Although the embodiments of the present disclosure are described with reference to the accompanying drawings, various modifications and variations can be made by persons skilled in the art without departing from the spirit and scope of the present disclosure, and such modifications and variations fall within the scope defined by the appended claims.

We claim:

1. A method for processing a service alarm based on a content delivery network (CDN), comprising:
   obtaining detection data and cause analysis data corresponding to a target domain name, wherein the detection data is obtained based on detecting an access behavior of a client corresponding to a CDN node to the target domain name, and the cause analysis data is obtained based on access behavior and node performance data of the CDN node;
   determining, by using the detection data, whether to perform a service alarm corresponding to the target domain name;
   in response to determining to perform the service alarm corresponding to the target domain name, determining a cause of the service alarm by using the cause analysis data; and
   obtaining a sending policy corresponding to the cause of the service alarm, and sending the cause of the service alarm to a target recipient device according to the sending policy,
   wherein determining, by using the detection data, whether to perform the service alarm corresponding to the target domain name comprises:
   querying a domain name blocking list;
   in response to the target domain name being included in the domain name blocking list, determining not to perform the service alarm corresponding to the target domain name;
   in response to the target domain name being not included in the domain name blocking list, extracting, from the detection data, access behavior data corresponding to a preset indicator;
   obtaining an alarm detection policy corresponding to the target domain name, wherein the alarm detection policy comprises an alarm condition corresponding to each of the preset indicator; and
   matching the access behavior data corresponding to the preset indicator with the alarm condition, to determine whether to perform the service alarm corresponding to the target domain name, and
   wherein each of the preset indicator comprises at least one of a bandwidth, a network delay, or a status code.

2. The method according to claim 1, wherein matching the access behavior data corresponding to the preset indicator with the alarm condition, to determine whether to perform the service alarm corresponding to the target domain name comprises:
   in response to the access behavior data corresponding to the preset indicator hitting the alarm condition, determining to perform the service alarm corresponding to the target domain name; or
   in response to the access behavior data corresponding to the preset indicator not hitting the alarm condition, determining not to perform the service alarm corresponding to the target domain name.

3. The method according to claim 1, wherein determining the cause of the service alarm by using the cause analysis data comprises:
   extracting an indicator change corresponding to the preset indicator from the cause analysis data;
   obtaining an alarm analysis policy corresponding to the target domain name, wherein the alarm analysis policy comprises a plurality of alarm types and a plurality of determination conditions associated with the alarm types, and each preset indicator corresponds to at least one determination condition;
   matching the indicator change corresponding to the preset indicator with a corresponding determination condition;
   in response to the indicator change corresponding to the preset indicator hitting the corresponding determination condition, determining the hit determination condition as a target determination condition;
   obtaining, from the alarm analysis policy, a target alarm type corresponding to the target determination condition, and obtaining an abnormal problem that causes the target alarm type; and
   generating the cause of the service alarm based on the target alarm type and the abnormal problem.

4. The method according to claim 3, wherein after obtaining, from the alarm analysis policy, the target alarm type corresponding to the target determination condition, the method further comprises:
   detecting whether the target alarm type is a normal alarm type;
   in response to the target alarm type being the normal alarm type, querying a historical alarm record;
   obtaining, from the historical alarm record, an alarm count of the normal alarm type corresponding to the target domain name; and
   in response to the alarm count being greater than or equal to a preset count, updating the target domain name to the domain name blocking list.

5. The method according to claim 1, wherein obtaining the sending policy corresponding to the cause of the service alarm, and sending the cause of the service alarm according to the sending policy comprise:
   detecting whether a target alarm type carried in the cause of the service alarm is an abnormal alarm type, wherein the abnormal alarm type comprises a CDN type and a source station type;
   in response to the target alarm type being the abnormal alarm type, determining a target recipient device corresponding to the target alarm type based on a mapping relationship between the abnormal alarm type and a recipient device; and
   sending the cause of the service alarm to the target recipient device.

6. The method according to claim 5, further comprising:
   in response to an alarm type and an alarm cause being not carried in the cause of the service alarm, obtaining a preset recipient device; and
   sending alarm prompt information to the preset recipient device.

7. A computer device, comprising:
   a memory and a processor, wherein the memory and the processor are communicatively connected to each other, the memory is stored with computer instructions, and the processor is configured to execute the computer instructions to:
   obtain detection data and cause analysis data corresponding to a target domain name, wherein the detection data is obtained based on detecting an access behavior of a client corresponding to a content delivery network (CDN) node to the target domain name, and the cause analysis data is obtained based on access behavior and node performance data of the CDN node;
   determine, by using the detection data, whether to perform a service alarm corresponding to the target domain name;

in response to determining to perform the service alarm corresponding to the target domain name, determine a cause of the service alarm by using the cause analysis data; and obtain a sending policy corresponding to the cause of the service alarm, and send the cause of the service alarm to a target recipient device according to the sending policy, wherein, to determine, by using the detection data, whether to perform the service alarm corresponding to the target domain name, the processor is configured to execute the computer instructions to:

query a domain name blocking list;

in response to the target domain name being included in the domain name blocking list, determine not to perform the service alarm corresponding to the target domain name;

in response to the target domain name being not included in the domain name blocking list, extract, from the detection data, access behavior data corresponding to a preset indicator;

obtain an alarm detection policy corresponding to the target domain name, wherein the alarm detection policy comprises an alarm condition corresponding to each of the preset indicator; and match the access behavior data corresponding to the preset indicator with the alarm condition, to determine whether to perform the service alarm corresponding to the target domain name, and wherein each of the preset indicator comprises at least one of a bandwidth, a network delay, or a status code.

8. The computer device according to claim 7, wherein to match the access behavior data corresponding to the preset indicator with the alarm condition, to determine whether to perform the service alarm corresponding to the target domain name, the processor is configured to execute the computer instructions to:

in response to the access behavior data corresponding to the preset indicator hitting the alarm condition, determine to perform the service alarm corresponding to the target domain name; or in response to the access behavior data corresponding to the preset indicator not hitting the alarm condition, determine not to perform the service alarm corresponding to the target domain name.

9. The computer device according to claim 7, wherein to determine the cause of the service alarm by using the cause analysis data, the processor is configured to execute the computer instructions to:

extract an indicator change corresponding to the preset indicator from the cause analysis data;

obtain an alarm analysis policy corresponding to the target domain name, wherein the alarm analysis policy comprises a plurality of alarm types and a plurality of determination conditions associated with the alarm types, and each preset indicator corresponds to at least one determination condition;

match the indicator change corresponding to the preset indicator with a corresponding determination condition;

in response to the indicator change corresponding to the preset indicator hitting the corresponding determination condition, determine the hit determination condition as a target determination condition;

obtain, from the alarm analysis policy, a target alarm type corresponding to the target determination condition, and obtain an abnormal problem that causes the target alarm type; and generate the cause of the service alarm based on the target alarm type and the abnormal problem.

10. The computer device according to claim 9, wherein after obtaining, from the alarm analysis policy, the target alarm type corresponding to the target determination condition, the processor is further configured to execute the computer instructions to:

detect whether the target alarm type is a normal alarm type;

in response to the target alarm type being the normal alarm type, query a historical alarm record;

obtain, from the historical alarm record, an alarm count of the normal alarm type corresponding to the target domain name; and in response to the alarm count being greater than or equal to a preset count, update the target domain name to the domain name blocking list.

11. The computer device according to claim 7, wherein to obtain the sending policy corresponding to the cause of the service alarm, and send the cause of the service alarm according to the sending policy, the processor is configured to execute the computer instructions to:

detect whether a target alarm type carried in the cause of the service alarm is an abnormal alarm type, wherein the abnormal alarm type comprises a CDN type and a source station type;

in response to the target alarm type being the abnormal alarm type, determine a target recipient device corresponding to the target alarm type based on a mapping relationship between the abnormal alarm type and a recipient device; and send the cause of the service alarm to the target recipient device.

12. The computer device according to claim 11, wherein the processor is further configured to execute the computer instructions to:

in response to an alarm type and an alarm cause being not carried in the cause of the service alarm, obtain a preset recipient device; and send alarm prompt information to the preset recipient device.

13. A non-transitory computer-readable storage medium, wherein the non-transitory computer-readable storage medium is stored with computer instructions, and the computer instructions are configured to cause a computer to:

obtain detection data and cause analysis data corresponding to a target domain name, wherein the detection data is obtained based on detecting an access behavior of a client corresponding to a content delivery network (CDN) node to the target domain name, and the cause analysis data is obtained based on access behavior and node performance data of the CDN node;

determine, by using the detection data, whether to perform a service alarm corresponding to the target domain name;

in response to determining to perform the service alarm corresponding to the target domain name, determine a cause of the service alarm by using the cause analysis data; and obtain a sending policy corresponding to the cause of the service alarm, and send the cause of the service alarm to a target recipient device according to the sending policy, wherein to determine, by using the detection data, whether to perform the service alarm corresponding to the target domain name, the computer instructions are configured to cause the computer to:
query a domain name blocking list;
in response to the target domain name being included in the domain name blocking list, determine not to perform the service alarm corresponding to the target domain name;
in response to the target domain name being not included in the domain name blocking list, extract, from the detection data, access behavior data corresponding to a preset indicator;
obtain an alarm detection policy corresponding to the target domain name, wherein the alarm detection policy comprises an alarm condition corresponding to each of the preset indicator; and
match the access behavior data corresponding to the preset indicator with the alarm condition, to determine whether to perform the service alarm corresponding to the target domain name, and
wherein each of the preset indicator comprises at least one of a bandwidth, a network delay, or a status code.

14. The non-transitory computer-readable storage medium according to claim 13, wherein to match the access behavior data corresponding to the preset indicator with the alarm condition, to determine whether to perform the service alarm corresponding to the target domain name, the computer instructions are configured to cause the computer to:
in response to the access behavior data corresponding to the preset indicator hitting the alarm condition, determine to perform the service alarm corresponding to the target domain name; or
in response to the access behavior data corresponding to the preset indicator not hitting the alarm condition, determine not to perform the service alarm corresponding to the target domain name.

15. The non-transitory computer-readable storage medium according to claim 13, wherein to determine the cause of the service alarm by using the cause analysis data, the computer instructions are configured to cause the computer to:
extract an indicator change corresponding to the preset indicator from the cause analysis data;
obtain an alarm analysis policy corresponding to the target domain name, wherein the alarm analysis policy comprises a plurality of alarm types and a plurality of determination conditions associated with the alarm types, and each preset indicator corresponds to at least one determination condition;
match the indicator change corresponding to the preset indicator with a corresponding determination condition;
in response to the indicator change corresponding to the preset indicator hitting the corresponding determination condition, determine the hit determination condition as a target determination condition;
obtain, from the alarm analysis policy, a target alarm type corresponding to the target determination condition, and obtain an abnormal problem that causes the target alarm type; and
generate the cause of the service alarm based on the target alarm type and the abnormal problem.

16. The non-transitory computer-readable storage medium according to claim 15, wherein after obtaining, from the alarm analysis policy, the target alarm type corresponding to the target determination condition, the computer instructions are configured to further cause the computer to:
detect whether the target alarm type is a normal alarm type;
in response to the target alarm type being the normal alarm type, query a historical alarm record;
obtain, from the historical alarm record, an alarm count of the normal alarm type corresponding to the target domain name; and
in response to the alarm count being greater than or equal to a preset count, update the target domain name to the domain name blocking list.

17. The non-transitory computer-readable storage medium according to claim 13, wherein to obtain the sending policy corresponding to the cause of the service alarm, and send the cause of the service alarm according to the sending policy, the computer instructions are configured to cause the computer to:
detect whether a target alarm type carried in the cause of the service alarm is an abnormal alarm type, wherein the abnormal alarm type comprises a CDN type and a source station type;
in response to the target alarm type being the abnormal alarm type, determine a target recipient device corresponding to the target alarm type based on a mapping relationship between the abnormal alarm type and a recipient device; and
send the cause of the service alarm to the target recipient device.

* * * * *